United States Patent [19]
Boelling

[11] Patent Number: 5,680,707
[45] Date of Patent: Oct. 28, 1997

[54] LADDER INCLINOMETER

[75] Inventor: James E. Boelling, Ankeny, Iowa

[73] Assignee: Wy-Tech, Inc., Des Moines, Iowa

[21] Appl. No.: 721,573

[22] Filed: Oct. 1, 1996

[51] Int. Cl.$^6$ ............................................... B23B 49/00
[52] U.S. Cl. ......................... 33/333; 33/370; 33/391; 33/399
[58] Field of Search ......................... 33/333, 334, 370, 33/371, 372, 373, 391, 399

[56] References Cited

U.S. PATENT DOCUMENTS

| | | |
|---|---|---|
| D. 195,431 | 6/1963 | Rieker, Jr. . |
| D. 249,875 | 10/1978 | Bumbal et al. . |
| 349,590 | 9/1886 | Hollingsworth . |
| 651,519 | 6/1900 | Algoud . |
| 667,836 | 2/1901 | Wood . |
| 790,813 | 5/1905 | Auld . |
| 834,964 | 11/1906 | Broderick ............ 33/391 |
| 1,116,452 | 11/1914 | Lorraine ............... 33/391 |
| 1,265,468 | 5/1918 | Madsen ................ 33/402 |
| 2,527,982 | 10/1950 | Brock . |
| 2,632,958 | 3/1953 | Masters . |
| 2,651,848 | 9/1953 | Sims . |
| 2,822,618 | 2/1958 | Wendel . |
| 2,845,719 | 8/1958 | Thomiszer ............ 33/333 |
| 3,118,234 | 1/1964 | Wilson ................. 33/371 |
| 3,159,924 | 12/1964 | Lieblein ............... 33/372 |
| 3,293,755 | 12/1966 | Cronwell . |
| 3,885,306 | 5/1975 | Herman ............... 33/372 |
| 4,492,029 | 1/1985 | Tanaka et al. . |
| 4,771,546 | 9/1988 | Cavazos ............... 33/391 |
| 5,063,679 | 11/1991 | Schwandt ............. 33/371 |
| 5,341,899 | 8/1994 | Casamento . |
| 5,520,384 | 5/1996 | Wetzel . |

FOREIGN PATENT DOCUMENTS 2119513  11/1983  United Kingdom .......... 33/333

Primary Examiner—Daniel G. DePumpo
Attorney, Agent, or Firm—Zarley, McKee, Thomte, Voorhees, & Sease

[57] ABSTRACT

A housing includes a pendulum having a window registerable with either of spaced apart indicia depending on what side of a ladder a housing is mounted to indicate the ladder is positioned at a safe angle against a vertical support. Wording on the pendulum is readable with wording in the spaced apart indicia to further indicate the ladder is at a safe angle. The pendulum is pointed at its lower end to register with third indicia positioned between the spaced apart indicia to indicate that the ladder is on a level surface.

9 Claims, 4 Drawing Sheets

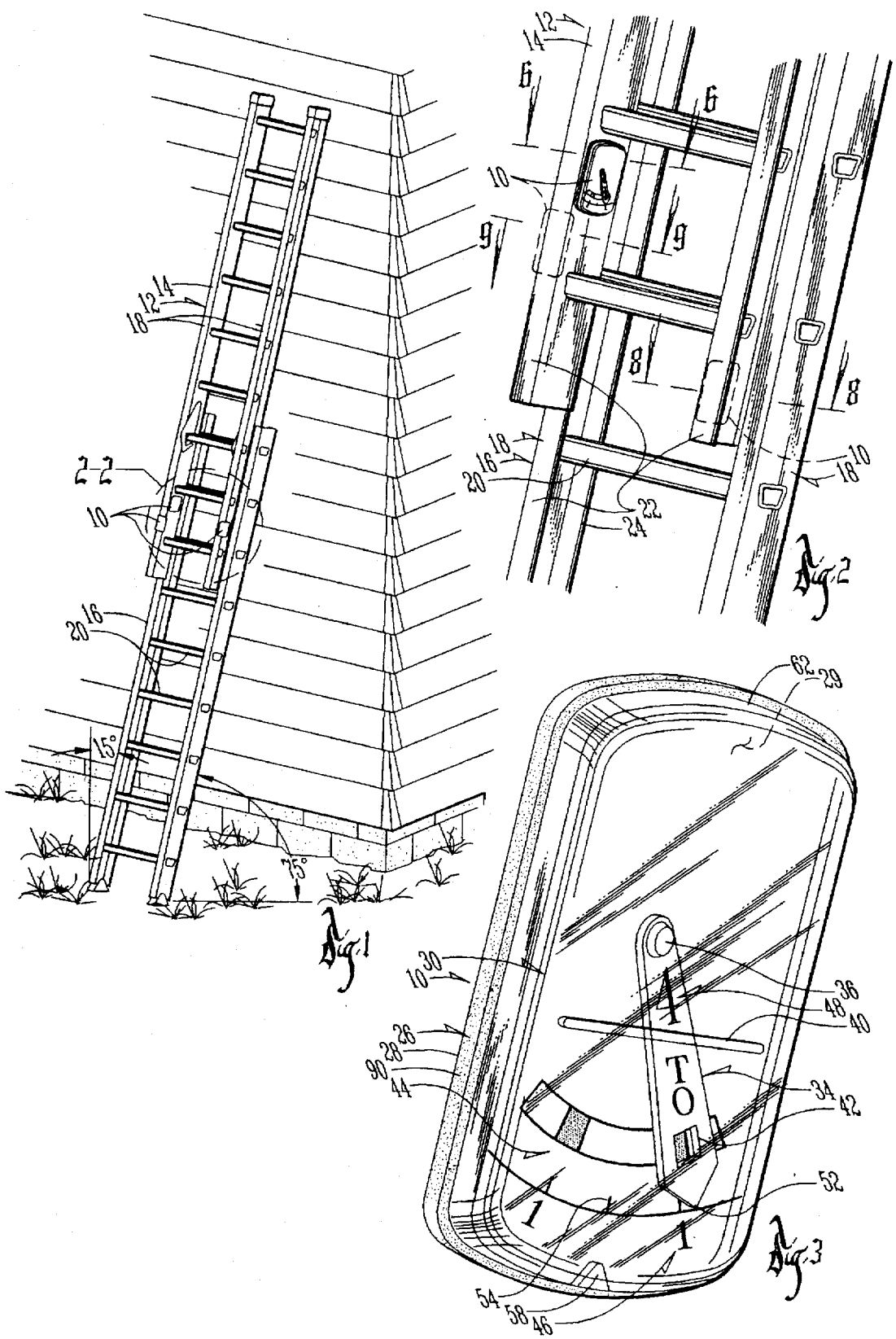

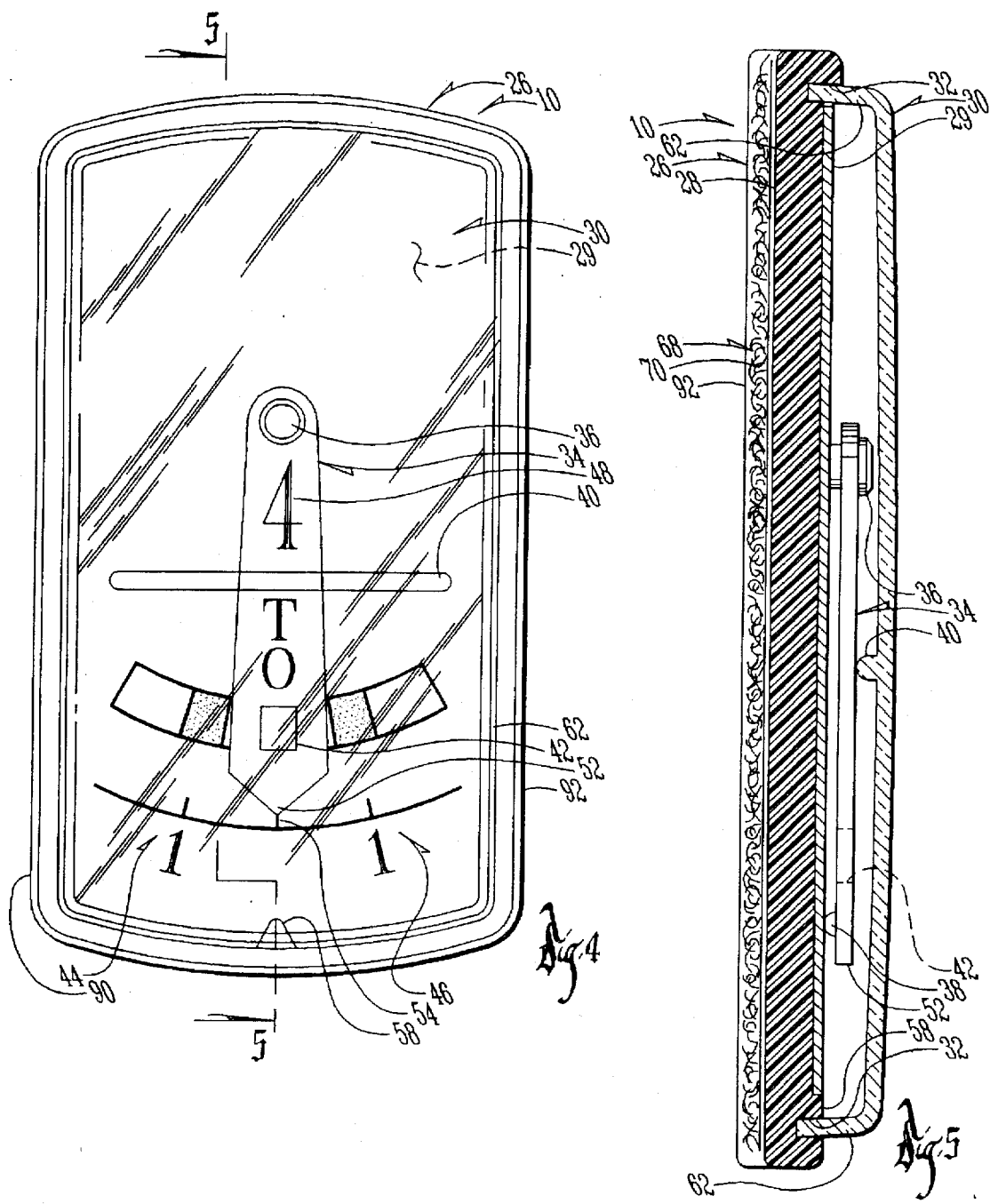

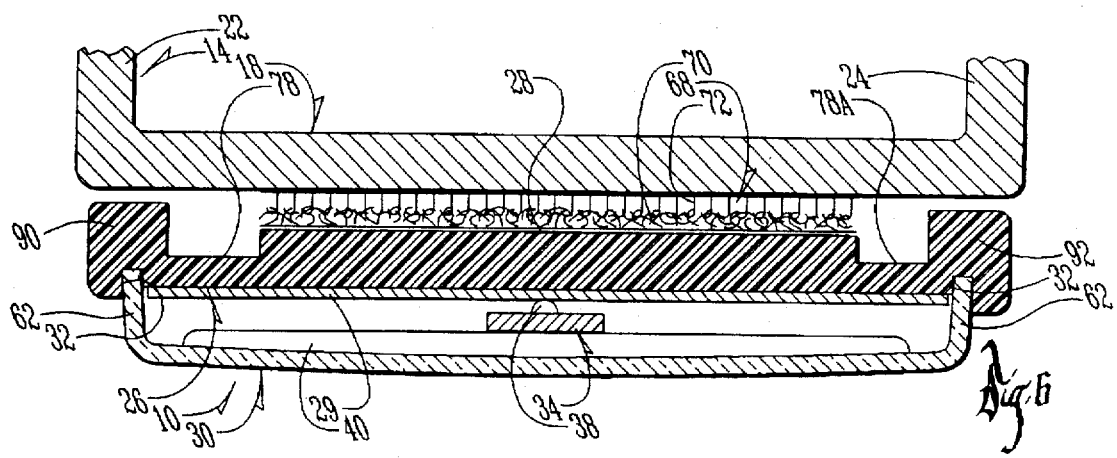
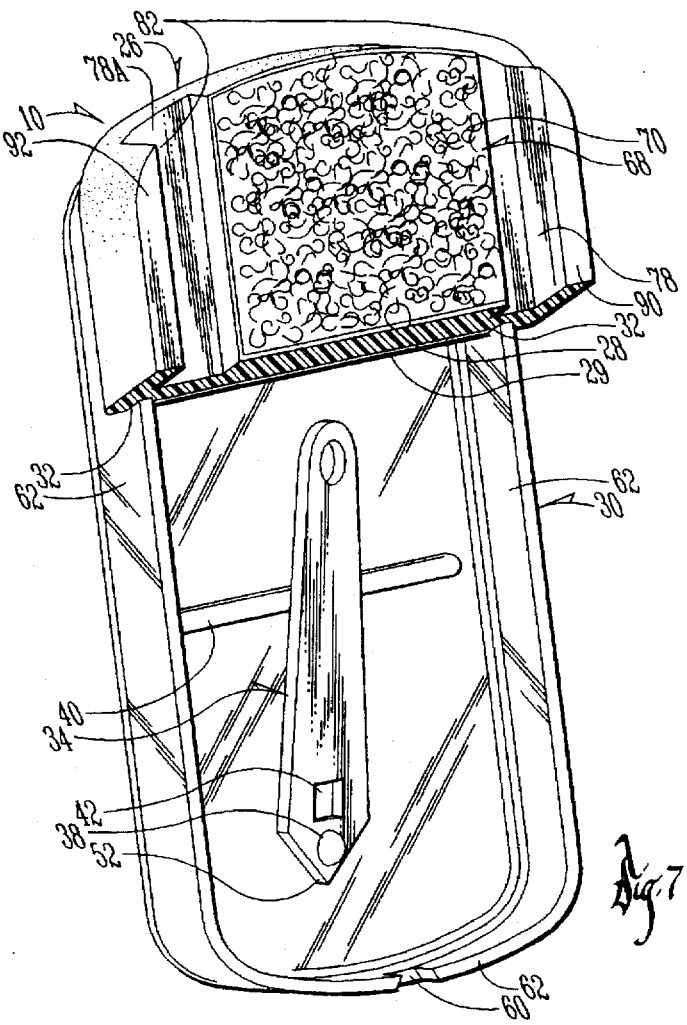

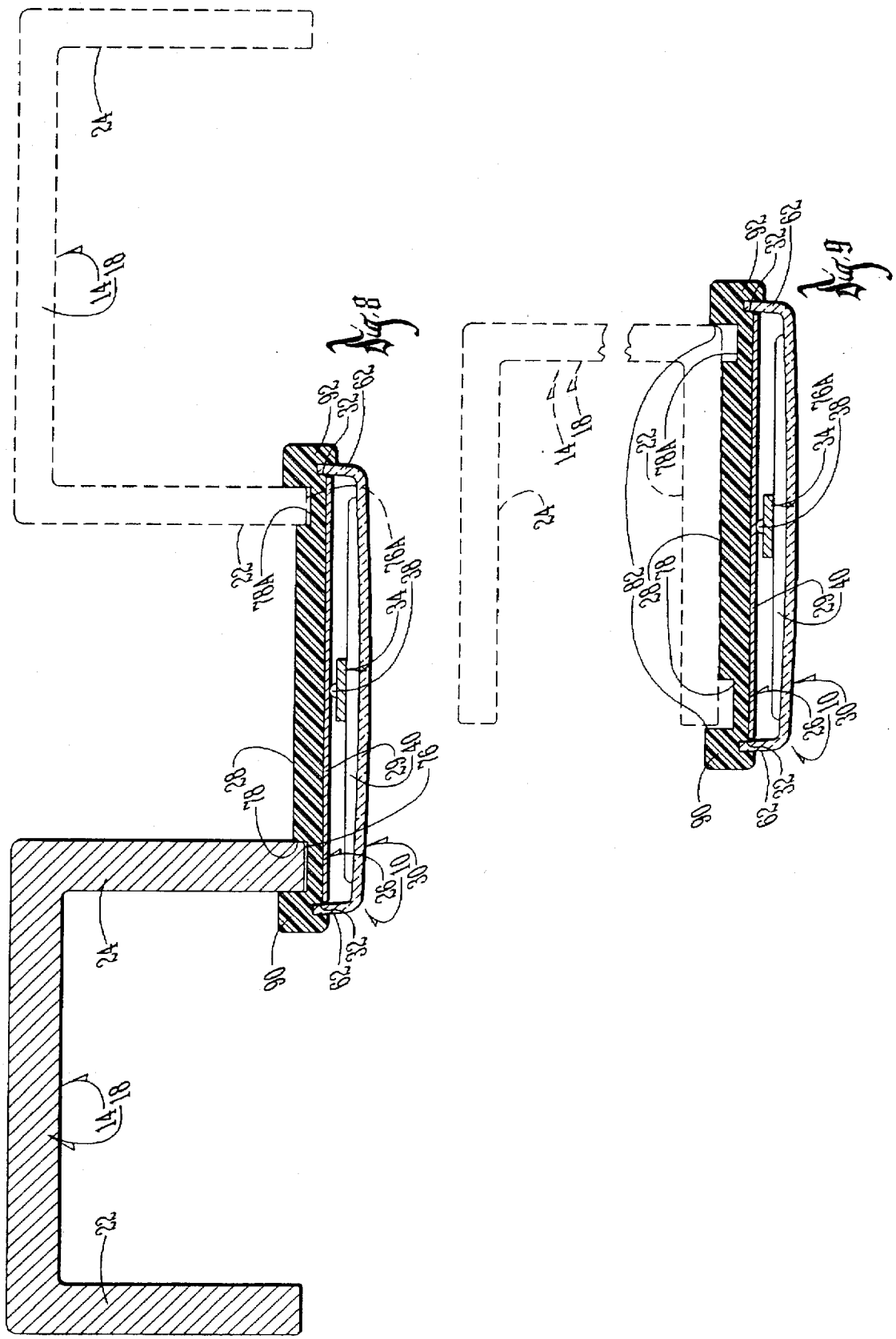

LADDER INCLINOMETER

CROSS-REFERENCE TO A RELATED APPLICATION

Ser. No. 29/048,632—LADDER INCLINOMETER

BACKGROUND OF THE INVENTION

Federal and state regulations require that a ladder be placed against a support surface at a safe angle which is defined as 75 degrees to the horizontal and 15 degrees to the vertical. The rule requirement is simple but the application of it is difficult and unreliable. One approach is to use a four to one ratio with the distance of the foot of the ladder from the vertical support being one unit for every four units of length of the ladder from its foot to the point on the ladder where it engages the vertical support. This system requires considerable measuring which allows for numerous errors to occur, making the system unreliable and the use of the ladder unsafe. Another approach is to have a person stand with the person's feet at the foot of the ladder and then the person's hands extended horizontally should touch the ladder if it is at a safe angle. A number of variables are present in the use of this system which make it unreliable, such as arm length varies from person to person and if the person does not stand straight the test will be inaccurate.

It is thus apparent that a more practical and reliable system is needed to ensure that a ladder is safely positioned before it is used, both relative to the angle of the ladder to the wall supporting it and the angle of the ladder to the ground.

SUMMARY OF THE INVENTION

The ladder inclinometer provided includes a pendulum having a window at its lower end registerable with either of spaced apart indicia when the ladder is at a safe angle to the vertical support. The spaced apart indicia allows for the inclinometer to be placed on either side of the ladder with one indicia being used on one side and the other indicia being on the other side. The window has a geometric shape corresponding to the shape of the indicia so that a quick visual reading may be made without any mental calculations being required.

The inclinometer can be mounted on the front of the ladder, and if the ladder is level the pendulum will hang straight down, indicating that it is on a level surface.

The spaced apart indicia includes the numeral 1 and the pendulum includes the wording "4 to" such that when the pendulum is aligned with either of the spaced apart indicia the statement "4 to 1" will be readable by the user, telling the user in a second way that the ladder is safe to use.

The inclinometer housing is versatile in that it may be mounted in several different ways on the rails of the ladder. One way is through the use of a Velcro fastener. A second way is through use of a channel formed on the back side of the housing receiving a front flange of a side rail of the ladder. A third fastening arrangement is through longitudinally extending grooves formed in the back side of the housing selectively receiving the appropriate width edge of a rail flange. Each of the two parallel grooves have a different width to accommodate flanges having different thicknesses.

The pendulum is free to pivot with a minimum of frictional drag due to a horizontally extending thin shoulder formed on the housing lens inner face engagable with the pendulum to keep the pendulum from otherwise engaging the lens inner face and producing drag. A nodule is provided on the back side of the pendulum for engaging the front face of the housing wall to minimize friction between the pendulum and the housing wall.

DESCRIPTION OF THE DRAWINGS

FIG. 1 is a perspective view of an extension ladder positioned against a vertical wall and a ladder inclinometer is shown mountable on the ladder in several different positions.

FIG. 2 is an enlarged fragmentary perspective view of a section of the ladder indicated by the line 2—2 in FIG. 1 showing alternate locations for mounting the inclinometer.

FIG. 3 is a perspective view of the inclinometer showing the window in the pendulum in registry with indicia on the wall of the housing to indicate the ladder is at a safe angle to a vertical support.

FIG. 4 is a plan view of the ladder inclinometer with the pendulum positioned on the longitudinal axis of the inclinometer housing, indicating that the ladder to which it is mounted is on level ground.

FIG. 5 is a cross sectional view taken along line 5—5 in FIG. 4.

FIG. 6 is a cross sectional view taken along line 6—6 in FIG. 2 showing the inclinometer housing being mounted through the use of Velcro to the inside face of a ladder rail channel.

FIG. 7 is a fragmentary cross sectional view from the rear of the housing, showing the interior of the housing including the pendulum.

FIG. 8 is a cross sectional view similar to FIG. 6 but taken along line 8—8 in FIG. 2, showing the housing mounted on a ladder side rail channel flange edge.

FIG. 9 is a cross sectional view similar to FIG. 6 but taken along line 9—9 in FIG. 2, showing the inclinometer housing mounted on a ladder rail channel front flange in a channel formed on the back side of the housing.

DESCRIPTION OF THE INVENTION

The ladder inclinometer of this invention is referred to generally in FIG. 3 by the reference numeral 10 and is shown in FIG. 1 mounted on an extension ladder 12 in three different alternate positions as is shown in more detail in FIG. 2. Ladder 12 includes an upper extension section 14 telescopically engaging in a conventional fashion a lower section 16. The ladder sections include side rails 18 inner connected by rungs 20, with the side rails 18 being formed from outwardly and oppositely facing channels having front and rear flanges 22 and 24.

The inclinometer 10 includes a housing 26 having a back wall 28 to which a lens 30 is secured by being received in a groove 32 formed in the front face of the wall 29 as seen in FIG. 5. A pendulum 34 is mounted on the front face of wall 29 by a pin 36. The pendulum includes a nodule 38 on its back side for engagement with the front face of the wall 29 to minimize friction between the pendulum and the wall. The inside face of the lens 30 includes a horizontally extending narrow shoulder 40 to provide a line of contact with the front face of the pendulum 34 to minimize drag.

A square window 42 is formed in the lower end of the pendulum 34 and is alternately registerable with spaced apart first and second indicia 44 and 46 having the same square shape. When the window 42 is registered with the first indicia 44 the housing 26 is mounted on the right side of the ladder as seen in dash lines in FIG. 2 and when registerable with the second indicia 46 is mounted on the left side as shown in the solid lines in FIG. 2. Registration of the window 42 with either of the indicia 44 or 46 indicates that the ladder is at a safe angle relative to its vertical support.

The pendulum 34 includes indicia 48 in the nature of wording "4 to" which can be read with the numeral 1 included in both the first indicia 44 and the second indicia 46, thus giving the ladder user a second way in which to confirm that the ladder is at a safe angle. The statement "4 to 1" means the ratio of the length of the ladder between its contact point with the vertical support and the ground, to the spacing from the vertical support to the foot of the ladder on the support surface. This relationship establishes an angle of 15 degrees between the base of the ladder and the vertical and 75 degrees with the ground surface as indicated in FIG. 1.

When the inclinometer 10 is mounted on the front of the ladder as shown in FIG. 9 the pendulum 34 which includes a pointed end 52 registers with a third indicia 54 between indicia 44 and 46 to indicate that the ladder is on a level surface. A V-shaped shoulder 58 is provided on the inner face of the back wall 28 and is also in alignment with the pointed end 52 of the pendulum 34 when the ladder is in a safe level position. The V-shaped shoulder 58 also functions to center the lens 30 by engaging a notch 60 in the lens peripheral wall 62 as seen in FIG. 7. In a manner similar to the use of the indicia 44 and 46, indicia may also be provided on the front face of the wall 29 to register with the window 42 to indicate the ladder is level.

The inclinometer 10 may be mounted in several different ways to the ladder as shown in FIGS. 1, 6, 8 and 9. As shown in FIG. 6 a Velcro fastener 68 may be used to mount the housing 26 on the inside face of left ladder side rail 18. The fastener 68 includes cooperating loops 70 on the housing 26 and hooks 72 on the ladder side rail 18. The length of the housing 26 is such that it can be easily aligned between the side rail flanges to ensure that an accurate reading is given.

An alternate mounting arrangement is shown in FIG. 8 wherein a side rail 18 flange 24 outer edge 76 is received in a groove 78 in the back side of the wall 28. A second groove 78A is provided in back side of the wall 28 to receive a rail flange 22 having a different thickness. Most ladders have flanges with thicknesses as shown.

In FIG. 9 a third mounting arrangement is shown wherein the front flange 22 of the rail 18 is received in a channel 82 formed in the back wall 28 of the housing 26. Outer walls 90 and 92 for the grooves 78 and 78A respectively form the channel 82.

It is thus seen that a reasonably fool-proof system has been provided for ladders to assure that they are mounted at a safe angle to the vertical support and are on a safe level surface. The inclinometer 10 is removably attached to the ladder and may be moved from one position to another quickly with the assurance that it is properly aligned to give an accurate reading. The actual reading of the inclinometer requires minimal thought since the user only needs to determine that the window in the pendulum is registered with indicia of a like shape on the front face of the housing wall 28. In determining whether the ladder is level and is on a flat surface the inclinometer 10 is mounted on the front of the ladder as seen in FIG. 9 and the user need only to determine that the pendulum is hanging in a centered vertical position.

What is claimed is:

1. A ladder inclinometer comprising, a housing including a wall having a face, indicia on said face, a pendulum pivotally mounted on said wall free to pivot in response to the forces of gravity, a window in said pendulum being registerable with said indicia to indicate when a ladder is at a safe angle, a lens extends substantially over said face through which said pendulum may be observed, an elongated shoulder on said lens extending transversely of said lens and said pendulum to provide substantial line contact with said pendulum when engaging said lens, and a nodule on said pendulum having a convex outer end facing said wall and for engagement with said wall.

2. The ladder inclinometer of claim 1 and releasable fastener means is provided on said housing to removably secure said housing to a side of a ladder.

3. The ladder inclinometer of claim 2 wherein said fastener means is further defined as being a hook and loop type fastener.

4. The ladder inclinometer of claim 2 wherein said fastener means comprises a ladder channel flange groove extending longitudinally on said housing on the side opposite said face to receive the outer edge of a ladder channel flange to align said housing with the longitudinal axis of a ladder and to provide support for said housing.

5. The ladder inclinometer of claim 4 and said ladder channel flange groove is one of two parallel grooves having different widths to receive ladder channel flanges having different thicknesses.

6. The ladder inclinometer of claim 2 wherein said fastener means includes a channel extending longitudinally of said housing on the side opposite said face to receive a flange side wall of a ladder side rail channel to align said housing with the longitudinal axis of a ladder and to provide support for said housing.

7. A ladder inclinometer comprising, a housing including a wall having a face, indicia on said face, a pendulum pivotally mounted on said wall free to pivot in response to the forces of gravity, a window in said pendulum being registerable with said indicia to indicate when a ladder is at a safe angle, said indicia being one of two indicia spaced apart on the face of said wall registerable with said window when said ladder is at a safe angle whereby when said inclinometer is mounted on one side of a ladder said one indicia registers with said window and when mounted on the opposite side said second indicia registers with said window, said pendulum including a pivot axis and said first and second indicia being spaced an equal distance from said pivot axis on an arc, said indicia being a geometrically shaped colored figure and said window being of a similar shape, said first and second indicia being spaced to indicate that a ladder is at an angle with a support of approximately 15 degrees, and indicia being provided on said pendulum which when read with indicia included in said first and second indicia when said pendulum is registered with one of said first and second indicia, the indicia on the pendulum and said one of first and second indicia creating a meaningful statement indicating the ladder is safe, said indicia on said pendulum including a first portion of the statement and the first and second indicia including a concluding portion of the statement whereby when said pendulum is registered with said first or second indicia, said meaningful statement is is complete, indicating the angle of the ladder to a support is a safe angle.

8. The ladder inclinometer of claim 7 and a third indicia is provided on said face centered between said first and second indicia to register with said pendulum when said housing is mounted on the front of a ladder and said ladder is in a level position.

9. The ladder inclinometer of claim 8 and said pendulum has a downwardly pointed lower end which is adapted to register with said third indicia.

* * * * *